July 7, 1959  K. R. NICKOLLS  2,893,877
METHOD FOR PACKAGING MEAT
Filed July 2, 1958

KENNETH R. NICKOLLS  INVENTOR.

BY
ATTORNEY

United States Patent Office 2,893,877
Patented July 7, 1959

2,893,877

METHOD FOR PACKAGING MEAT

Kenneth R. Nickolls, Wilbraham, Mass., assignor to Monsanto Chemical Company, St. Louis, Mo., a corporation of Delaware Application July 2, 1958, Serial No. 746,140

1 Claim. (Cl. 99—174)

The invention relates to a method for packaging and storing fresh meat products.

In the so-called self-service meat departments of grocery stores, fresh meats such as steaks, chops, roasts, hamburger, fresh fish, fresh poultry, etc. are placed in shallow wooden or paper trays and wrapped with a clear, transparent, thermoplastic film such as cellophane which is heat-sealed, usually on the bottom of the tray. The purchasers of such sealed meat packages will frequently store the packages in the freezing compartment of a household refrigerator or freezer.

The above noted method of packaging and storing fresh meat products is subject to certain shortcomings. The tray employed is usually permeable to air and water vapor; consequently, unless the tray is completely enveloped in the thermoplastic film, the package will be able to breathe and the meat product contained therein may have a shorter storage life than expected. Even if the package is frozen, the meat product may become dehydrated during storage, i.e., suffer from "freezer burn." When the meat package is frozen in the consumer's home, there is frequently a considerable interval between the time when the package is removed from a refrigerator at the store and placed in the consumer's freezer. In this time interval, the meat may warm up and exude meat juices which penetrate the tray. When the meat package is subsequently frozen, the meat becomes firmly bonded to the frozen tray and cannot be separated therefrom until it is substantially completely thawed. This delay can be an annoying and unnecessary inconvenience to the housewife, since many meats can be placed in the cooking utensil before they are thawed. In addition, the absorption of meat juices by the tray impairs the quality of the meat.

It is an object of this invention to provide an improved method for packaging fresh meat products.

Another object of this invention is to provide an improved sealed meat package which is substantially impermeable to air and water vapor.

A further object of this invention is to provide an improved sealed meat package in which the meat will not become bonded to the package when the meat is frozen.

Other objects and advantages of the invention will be apparent from the following detailed description thereof when read in conjunction with the attached drawings in which.

The above and related objects are attained by placing a fresh meat package in a lightweight plastic tray and tightly enveloping and sealing said meat product and tray in a thin, transparent, heat-sealable, thermoplastic film having low vapor transmission characteristics. The lightweight plastic tray consists of a formed laminar sheet in which the core is a styrene polymer foam having a density of less than 10 lbs./ft.$^3$ and a closed cell structure in which a majority of the cells have a diameter of less than about 0.02" and the skins or surface laminae of the laminar sheet consist of a styrene polymer having a density of at least 20 lbs./ft.$^3$.

Figure 1:
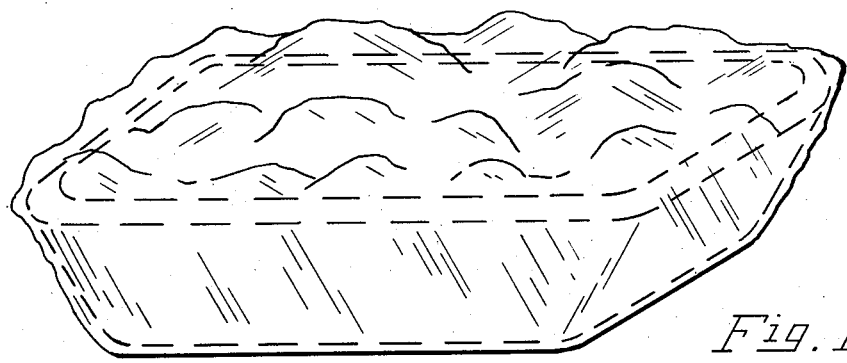
Fig. 1 is a perspective view of a meat package prepared by the method of this invention.
Figure 2:
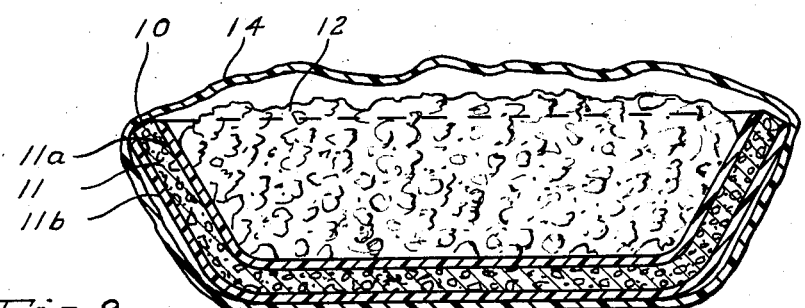
Fig. 2 is a vertical section taken through the package of Fig. 1.

Referring to Figs. 1 and 2 of the drawings, a fresh meat product 12, e.g., hamburger, is placed in a lightweight plastic tray 10 and both the hamburger and the tray are completely enveloped and sealed with moisture proof cellophane 14. The tray 10 consists of a laminar sheet in which the core section 11 consists of a styrene polymer foam and the skins 11a and 11b consist of an unfoamed styrene polymer. The core section 11 is approximately 0.100" thick and consists of a styrene polymer foam having a density of about 6 lbs./ft.$^3$ and a closed cell structure in which the majority of the cells have a diameter of about 0.01".

The skins 11a and 11b are approximately 0.0001–0.001" thick and consist of either an unfoamed styrene polymer or a styrene polymer foam having a density of at least 20 lbs./ft.$^3$.

The trays employed in the invention are fabricated from a laminar sheet in which the core consists of a styrene polymer foam having a density of less than about 10 lbs./ft.$^3$ and a closed cell structure in which a majority of the cells have a diameter of less than about 0.02" and preferably less than about 0.01". In a preferred embodiment of the invention the styrene polymer foam core has a density of substantially less than about 10 lbs./ft.$^3$, e.g., less than about 6 lbs./ft.$^3$ and more especially less than about 4 lbs./ft.$^3$. The skins or surface laminae of the laminar sheet consist of either an unfoamed styrene polymer or a styrene polymer foam having a density of greater than 20 lbs./ft.$^3$. In one embodiment of the invention, the skins or surface laminae may be bilayered with the outer layer being an unfoamed styrene polymer and the inner layer adjacent to the core being a styrene polymer foam having a density in excess of 20 lbs./ft.$^3$. The core of the laminar sheet will vary in thickness from about 0.050" to about 0.200" and the skins or surface laminae will vary in thickness from about 0.0001" to about 0.003". The trays of the invention, despite their light weight, are remarkably flexible and rugged. Moreover, the trays have low vapor transmission characteristics and this property insures a water and vapor tight package even if the sealable thermoplastic film does not completely encase the bottom of the tray.

The laminar sheets employed in the manufacture of the meat trays can be prepared by cementing 0.0001–0.003" thick sheets of either an unfoamed styrene polymer or a styrene polymer foam having a density of at least 20 lbs./ft.$^3$ to both surfaces of a 0.050–0.200" thick core sheet of a foamed styrene polymer having a density and cell structure within the limits previously described. Unfoamed and high density foamed styrene polymer sheets having the necessary thickness for use as skins can be prepared by blow extrusion techniques. Unfoamed styrene polymer sheets in at least certain thicknesses within the scope of the invention are commercially available. Foamed styrene polymer sheets having the required density and cell structure for use as the core sheet can be prepared by the method disclosed in U.S. 2,797,443.

Figure 3:
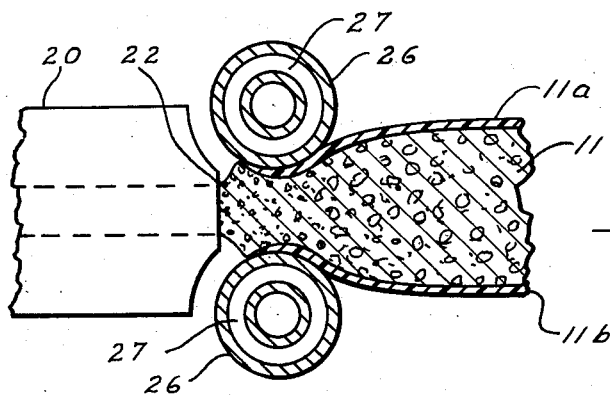
Fig. 3 is a schematic view, partially in section, of a method for preparing the laminar plastic sheet used in the manufacture of the trays employed in the method of the present invention.

Alternatively, the laminar sheets can be prepared directly by the extrusion method illustrated in Fig. 3. In Fig. 3, a mixture of 100 parts of polystyrene, 5–8 parts of pentane and 2–3 parts of water (to provide the desired cell size) is delivered by an extruder (not shown) into an extruder die 20 in a fluid state above its melting point, but foaming within the extruder and the extruder die is suppressed by maintaining the plastic mass under pressure. When the plastic mass is extruded in sheet form through orifice 22, the sudden pressure drop (extruder pressure to atmospheric pressure) causes rapid foaming of sheet 11. Orifice 22 is positioned very close to the nip of rolls 26—26 and as a result, sheet 11 contacts the rolls before it has completely foamed. In passing through the nip of the rolls, the surfaces of the sheet are cooled and the expansion of the resin forces the sheet into pressured engagement with the rolls thereby providing thin skins 11a and 11b of an essentially unfoamed polystyrene on the foamed styrene polymer sheet 11. The foamed contacting surfaces of rolls 26—26 are cooled by circulating cooling water through the liquid chambers 27—27 provided therein.

The laminar sheets above described can be fabricated into trays by numerous conventional techniques, including the well-known vacuum drape-forming technique.

The styrene foams which may be employed as the core of the laminar sheets are foams of either styrene homopolymers or interpolymers of styrene containing a predominant proportion of styrene, i.e., greater than 50 weight percent and preferably greater than 75 weight percent styrene. Examples of monomers that may be interpolymerized with the styrene include the conjugated 1,3-dienes, e.g., butadiene, isoprene, etc., alpha-beta unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile; divinylbenzene, etc. If desired, blends of the styrene polymer with other polymers may be employed, e.g., blends of the styrene polymer with rubbery diene polymers or the analogous compositions obtained by polymerizing styrene monomer in the presence of a rubbery diene polymer.

In any of the above type resins, all or a portion of the styrene may be replaced with its closely related homologues such as alpha-methylstyrene, o-, p-, and m-methylstyrenes, o-, m-, and p-ethylstyrenes, 2,4-dimethylstyrene, etc. In general, the styrene polymers employed should have a molecular weight in the range of about 40,000–80,000 (as determined by the Staudinger method). The styrene polymers included in the skins or surface laminae of the laminar sheet are of the same type as included in the core of the laminar sheet and above described.

The transparent, heat-sealable, thermoplastic film employed to wrap the tray and meat may be any of the well-known polymeric films presently employed for wrapping meat, cheese, etc. Examples of suitable materials include moisture-proof cellophane, rubber hydrochloride films, vinylidene chloride copolymer films, oriented polyethylene terephthalate films, polyethylene films, etc. All of these films have suitably low vapor transmission characteristics.

The above descriptions and particularly the examples and the drawings are set forth for purposes of illustration only. Many other variations and modifications thereof will be apparent to those skilled in the art and can be made without departing from the spirit and scope of the invention herein described.

This application is a continuation-in-part of my copending application, S.N. 628,435, filed December 14, 1956, now abandoned.

What is claimed is:

A method for packaging a fresh meat product which comprising placing a fresh meat product in a lightweight plastic tray and tightly enveloping and sealing said fresh meat product and tray in a thin, transparent, heat-sealable thermoplastic film having low vapor transmission characteristics; said lightweight plastic tray consisting of a laminar sheet in which the core is a sheet of styrene polymer foam having a density of less than about 10 lbs./ft.$^3$ and a closed cell structure in which the majority of cells have a diameter of less than about 0.02" and the top and bottom skins are a styrene polymer having a density of at least 20 lbs./ft.$^3$; said top and bottom skins of said laminar sheet being about 0.0001–0.003" thick, the foamed styrene polymer core of said laminar sheet being about 0.050–0.200" thick.

References Cited in the file of this patent

UNITED STATES PATENTS

| | | |
|---|---|---|
| 2,484,608 | Cheyney et al. | Oct. 11, 1949 |
| 2,536,639 | Guyer | Jan. 2, 1951 |
| 2,767,436 | Noland et al. | Oct. 23, 1956 |
| 2,770,406 | Lane | Nov. 13, 1956 |

OTHER REFERENCES

"Modern Packaging," September 1950, page 93.

"Modern Packaging," November 1954, page 230, article entitled Polystyrene Foam Insulates Meat Patties.